United States Patent
Kamiyama et al.

[11] Patent Number: 5,540,613
[45] Date of Patent: Jul. 30, 1996

[54] CUTTER APPARATUS

[75] Inventors: Takao Kamiyama, Hiratsuka; Yasuhiro Yokoshima; Shigeru Endoh, both of Ibaraki-ken, all of Japan

[73] Assignees: Shonan Gosei-Jushi Seisakusho K.K., Kanagawa-ken; Yokoshima & Company; Get Inc., both of Ibaraki-ken, all of Japan

[21] Appl. No.: 384,993

[22] Filed: Feb. 7, 1995

[30] Foreign Application Priority Data

Jul. 25, 1994 [JP] Japan .................................. 6-172815

[51] Int. Cl.⁶ .................................................. B24B 41/00
[52] U.S. Cl. .............................. 451/24; 451/27; 451/151
[58] Field of Search .............................. 451/24, 27, 120, 451/150, 151, 156

[56] References Cited

U.S. PATENT DOCUMENTS 4,442,891  4/1984  Wood ..................... 409/143
5,197,540  3/1993  Yagi et al. ............... 409/143
5,238,338  8/1993  Stucky .................... 409/143

FOREIGN PATENT DOCUMENTS 60-242038  12/1985  Japan .
2232130    9/1990   Japan ..................... 409/143

Primary Examiner—Maurina T. Rachuba
Attorney, Agent, or Firm—Lowe, Price, LeBlanc & Becker

[57] ABSTRACT

A cutter robot used to operate in a horizontal pipe having a horizontally extending main body, a stand gear to support the main body aloft, and a head bearing a rotary grinder assembly, and this head consists of: (i) a motor having an upward output shaft to bear the grinder assembly locked about its end, (ii) two holders, and (iii) two vertically held piston cylinders, which are arranged such that the first piston cylinder connected to the main body has an upward piston rod, and the first holder means supported at the end of the upward piston rod of the first piston cylinder holds the second piston cylinder, and the second holder means supported at the end of the downward piston rod of the second piston cylinder holds the motor.

3 Claims, 8 Drawing Sheets

CUTTER APPARATUS

TECHNICAL FIELD

The present invention relates to a rotary cutter apparatus equipped with a rotary grinder disk which can be used conveniently and effectively at a certain step in a pipe repair operation wherein a lining material is applied to the inner wall of the pipe which has a second pipe branching thereoff. The cutter apparatus of the present invention is an on-the-sleigh robot having a rotary grinder disk which can be shifted vertically, and can cut with its side surface as well as its top and bottom surfaces.

BACKGROUND ART

When an underground pipe, such as a pipeline and a passageway, becomes defective or too old to perform properly, the pipe is repaired and rehabilitated without digging the earth to expose the pipe and disassembling the sections of the pipe. This non-digging method of repairing an underground pipe has been known and practiced commonly in the field of civil engineering. Typically, the method is disclosed by Japanese Provisional Patent Publication (Kokai) No. 60-242038.

According to this publication, this method of pipe repair comprises inserting a sufficiently long tubular flexible liner bag into the pipe to be repaired by means of a pressurized fluid, like air and water. The tubular liner bag is made of a flexible resin-absorbent material impregnated with a thermosetting resin, and has the outer surface covered with an impermeable plastic film.

More particularly, according to the publication, the tubular flexible liner bag is closed at one end and open at the other; the tubular flexible liner bag is first flattened, then, the closed end of the tubular liner bag is tied to a control rope; the open end of the tubular liner bag is made to gape wide and hooked (anchored) at the end of the defective or old pipe in a manner such that the wide-opened end of the liner completely and fixedly covers and closes the pipe end; a portion of the liner is pushed into the pipe; then, the pressurized fluid is applied to the said portion of the tubular liner such that the fluid urges the tubular liner to enter the pipe. Since one end of the tubular liner is hooked at the end of the pipe, it remains there while the rest of the flexible liner bag is turned inside out as it proceeds deeper in the pipe. (Hereinafter, this manner of insertion shall be called "everting".) When the entire length of the tubular liner bag is everted(i.e., turned inside out) into the pipe, the control rope holds the closed end of the tubular liner bag to thereby control the length of the tubular liner in the pipe. Then, the everted tubular liner is pressed against the inner wall of the pipe by the said pressurized fluid, and the tubular flexible liner is hardened as the thermosetting resin impregnated in the liner is heated, which is effected by heating the fluid filling the tubular liner bag by means of a hot steam, etc. It is thus possible to line the inside wall of the defective or old pipe with a rigid liner without digging the ground and disassembling the pipe sections.

When, however, this method is applied to a pipe having a second pipe branching out from it, like the one 123 shown by cross section in FIG. 10, it is necessary to cut off that portion of the liner 125 which closes the branch pipe 124.

To do so, an on-the-sleigh robot (cutter apparatus), like the one 101 shown in FIG. 11, having a hole saw type rotary grinder disk 116 of a diameter corresponding to the size of the branch pipe 124 is conventionally employed, which is brought in the main pipe 123 and operated to cut and remove that portion of the the liner 125 which closes the opening of the branch pipe 124, so as to establish communication between the main pipe 123 and the branch pipe 124. As shown, the rotary grinder disk 116 is topped with a conical grinding cutter.

The on-the-sleigh robot 101 as described above comprises a robot main body 106, which is mounted on a pair of sleigh boards and thus capable of sliding to move in the main pipe. On the robot main body 106 are mounted a flash light 107 and a TV camera 108 for monitoring. Further, a vertical piston cylinder 112 having a piston rod is connected to the head of the robot main body 106, and a motor 115 is supported on the piston rod in a manner such that the motor 115 can be shifted up and down, and the rotary grinder disk 116 is locked about the end of the output shaft of the motor 115.

Thus, in an operation of removing that round portion of the liner 125 which closes the branch pipe, the on-the-sleigh robot 101 is first introduced into the main pipe 123 and brought to the optimum position, as shown in FIG. 11, and then the motor 115 is started and the piston cylinder 112 is operated to raise the turning grinder disk 116 toward the liner 125. Thus, the obstacle portion of the liner 125 is ground off by the grinder disk 116, and the communication between the main pipe 123 and the branch pipe 124 is resumed.

Now, in the conventional on-the-sleigh robot 101 shown in FIG. 11, the maximum distance through which the grinder disk 116 can move vertically is limited by the stroke length through which the piston cylinder 112 can reciprocate its piston rod, so that depending on the diameter of the main pipe 123, it can happen that the grinder disk 116 fails to completely grind off the obstacle portion of the liner 125. As shown in FIG. 10, the smaller the radius r (D/2) of the main pipe 123 is (that is, the greater the curvature is), the greater will the warpage height H of the obstacle portion of the liner 125 be; so that in the case of a pipe of a relatively small diameter, this problem is more liable to occur.

DISCLOSURE OF THE INVENTION

An object of the present invention is to provide an on-the-sleigh robot which can provide the a grinder disk with a sufficient amount of vertical movement thereby solving the previously-mentioned problem of conventional on-the-sleigh robots.

In order to attain the above and other objects of the invention, there is provided a cutter apparatus having a horizontally extending main body, a stand means to support said main body aloft, and a head bearing a rotary grinder assembly, wherein this head comprises a motor having an upward output shaft to turn said grinder assembly locked about the end thereof, a plurality of holder means, and vertically held piston cylinders as many as said holder means, arranged such that a first cylinder is connected to said main body, a second cylinder is held by a first holder means which is supported by the piston rod of the first cylinder, a third cylinder is held by a second holder means which is supported by the piston rod of the second cylinder, and so on until finally said motor is held by the last one of the holder means which is supported by the piston rod of the last one of the cylinders.

In a preferable case, however, the piston cylinders are arranged such that each one has its piston rod extending in the direction opposite to the direction of the neighboring piston cylinder(s).

In an embodiment, there are provided two piston cylinders and two holder means, and the first piston cylinder connected to said main body has an upward piston rod, and the first holder means supported at the end of said upward piston rod of the first piston cylinder holds the second piston cylinder, and the second holder means supported at the end of the downward piston rod of the second piston cylinder holds the motor.

According to the invention, the amount of possible vertical displacement of the first holder relative to the main body is determined by the stroke of the first piston cylinder, and the amount of possible vertical displacement of the second holder relative to the first holder is determined by the stroke of the second piston cylinder, and so on, so that the amount of possible vertical displacement of the grinder assembly, which is supported on the last one of the holders, relative to the main body is the sum of the respective strokes of all the piston cylinders. Accordingly, the amount of vertical displacement of the grinder assembly of the present embodiment is increased over the prior art by the amount equal to sum of the strokes of the piston cylinders minus the stroke of the first piston cylinder; hence it is now possible to provide the grinder assembly with a sufficient amount of vertical movement, enabling the operator to conduct a more accurate and effective cutting operation.

The above and other objects and features of the invention will appear more fully hereinafter in the following description given in connection with the accompanying drawings and the novelty thereof pointed out in the appended claims.

DESCRIPTION OF THE INVENTION

Next, an embodiment of the invention will be described with reference to the attached drawings.

Figure 1:
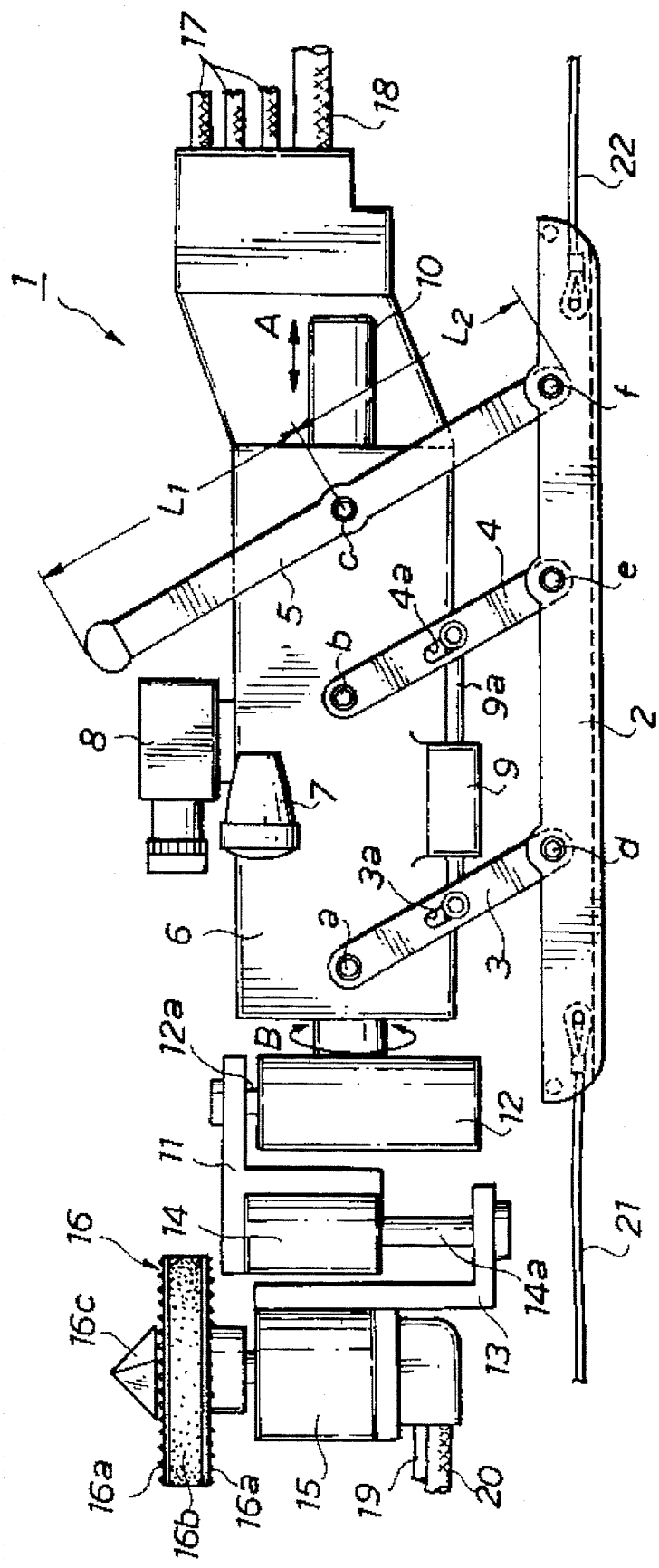
FIG. 1 is a side view of an on-the-sleigh robot according to an embodiment of the invention.
Figure 2:
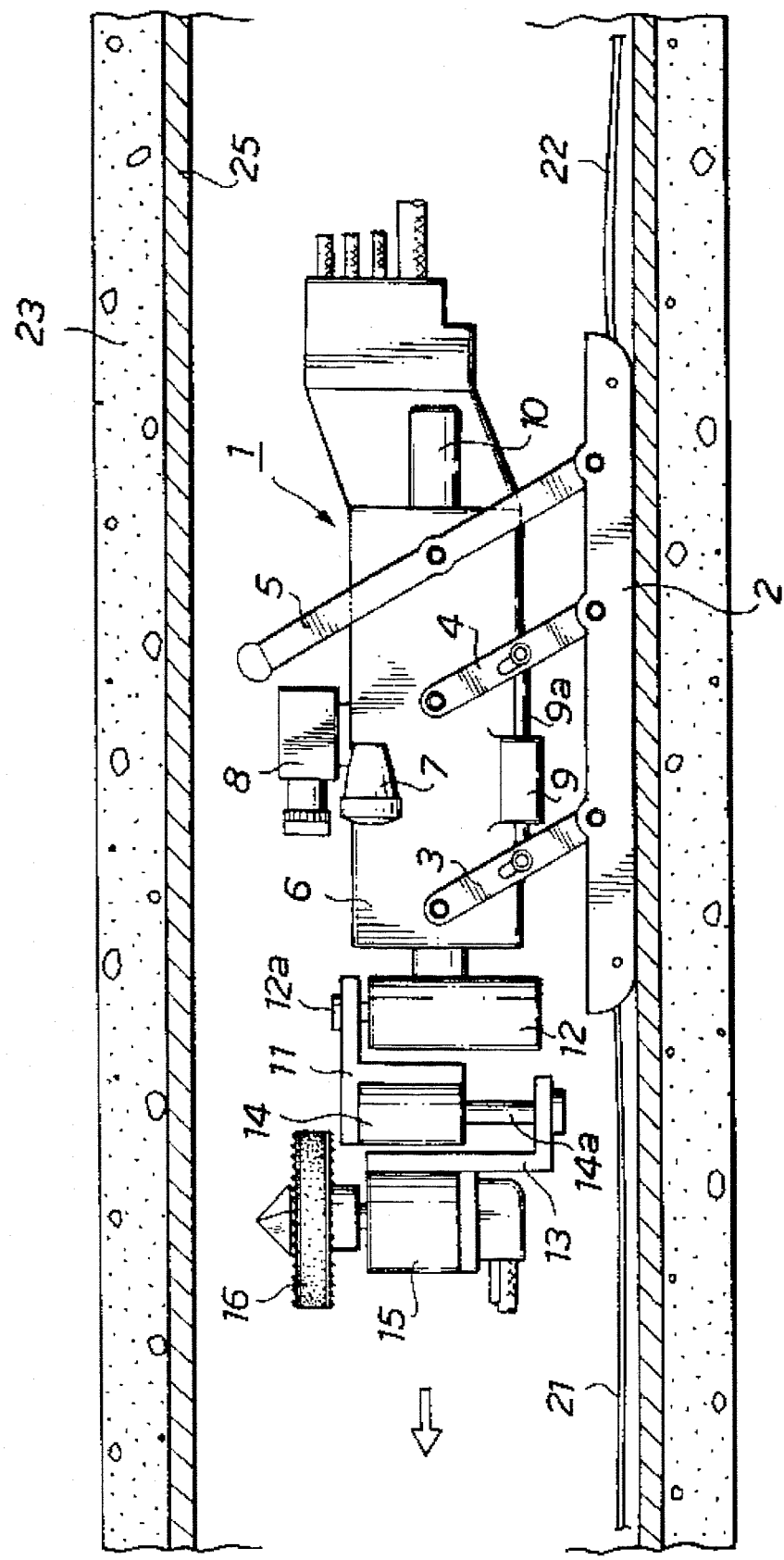
FIG. 2 is a side view of the on-the-sleigh robot as it is traveling in a main pipe.
Figure 3:
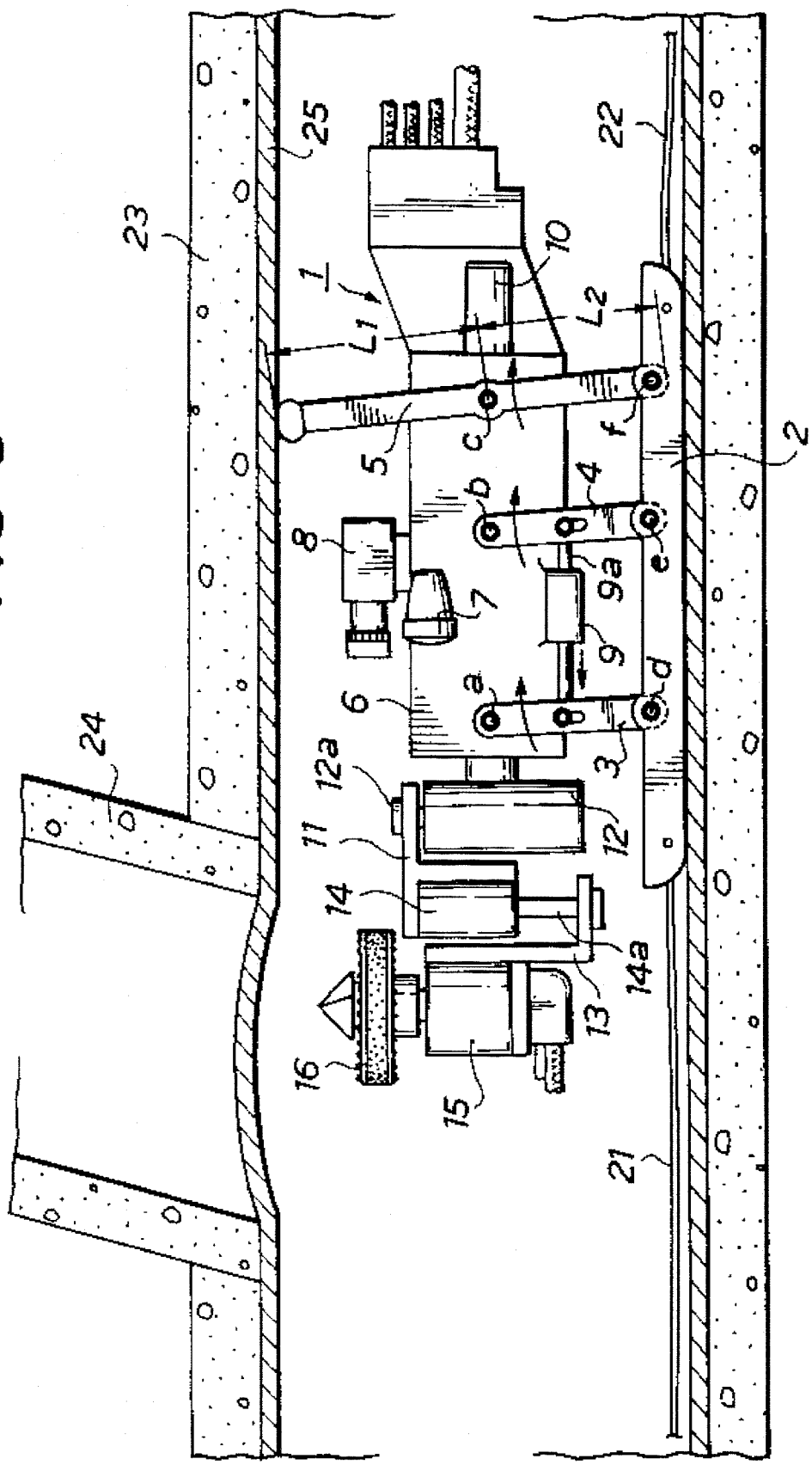
FIG. 3 is a side view of the on-the-sleigh robot as it is immobilized in the main pipe.

FIG. 1 is a side view of an on-the-sleigh robot according to the present invention; FIG. 2 is a side view of the same on-the-sleigh robot as it is on the move in a main pipe shown in cross section; FIG. 3 is a side view of the on-the-sleigh robot as it is immobilized in the main pipe; FIG. 4 through FIG. 9 are vertical cross sections showing the consecutive steps for cutting open the tubular liner bag.

As shown in FIG. 1, the on-the-sleigh robot 1 of the present embodiment has a main body 6, which has three pairs of parallel legs 3, 3, 4, 4, 5, 5, which are pivotally shod with a sleigh 2, and a flash light 7 and a TV camera for monitoring are fixed on the back of the main body 6.

Now, each pair of the parallel legs 3, 4, 5, are parallel to other pairs as well, and are each pivotally connected to the respective sides of the main body 6 at the locations indicated by the alphabets a, b, and c, which are alongside the center line of the generally cylindrical main body 6. The rearmost pair of the legs 5, 5 extend beyond the connection points c, and the lengths of the legs 5, 5 are such that the pivotal point c is the middle of the legs 5, 5. In other words, the distance L1 from the pivotal point c to the upper end of the leg 5 is equal to the distance L2 from the pivotal point c to the lower end of the same (L1=L2).

A pair of hydraulically operated piston cylinders 9, 9 are horizontally welded to the belly portion of the main body 6, one cylinder on either side, and each piston cylinder 9 is provided with a piston rod 9a which reciprocates therethrough. On either side, the embossed front end of the piston rod 9a is slidably caught in a slit hole 3a made in the leg 3, and the embossed rear end of the piston rod 9a is also slidably caught in a slit hole 4a made in the leg 4.

Along the center line of the main body 6 of the on-the-sleigh robot 1 penetrates a thick slider rod 10, which is capable of sliding along the center line when driven hydraulically, as indicated by the double-pointed arrow A in FIG. 1, and also capable of spinning round about the center line, as indicated by the curved arrow B. At the front end of the slider rod 10 is connected a hydraulically operated first piston cylinder 12, whose upward piston rod 12a supports a first holder 11, which is connected at the end of the rod 12a, so that the first holder 11 is vertically shifted relative to the first piston cylinder 12.

The first holder 11 holds a second hydraulically operated piston cylinder 14, whose downward piston rod 14a supports a second holder 13, which is connected at the end of the rod 14a, so that the second holder 13 is also vertically shifted relative to the second piston cylinder 14.

The second holder 13 holds an hydraulically operated motor 15, and a grinder assembly 16 is locked about the end of the upward output shaft of the motor 15. This grinder assembly 16 is constructed by sandwiching a support disk 16b between an upper sanding plate 16a and a lower sanding plate 16a (which are arranged in a vertical row along the motor shaft as shown in FIG. 1). The sanding plates 16a, 16a have their abrasive flat faces exposed and also the support disk 16b has its abrasive lateral face exposed between the two sanding plates 16a. A tapered reamer 16c is provided to form the spire of the assembly rising from the middle of the upper sanding plate 16a. This reamer 16c, the sanding plates 16a, and the support disk 16b are assembled such that they can be detached axially from the motor shaft.

At the rear end of the robot main body 6 are connected three hydraulic hoses 17 and one electric cord 18. Also, one hydraulic hose 19 and one electric cord 20 are connected to the hydraulic motor 15. One pull rope 21 is tied at the front part of the sleigh 2 and another pull rope 22 is tied at the rear part of the sleigh 2.

In this embodiment, the hydraulically operated piston cylinders 12 and 14 are employed for causing the grinder assembly 16 to ascend and descend, and the hydraulically operated piston cylinders 9 for causing the legs 3, 4 to tilt and stand upright; however, it is possible to employ other similar means, such as pneumatically operated piston cylinders (air cylinders), in place of the hydraulically operated cylinders. Also, in this embodiment, although a hydraulically operated motor 15 is used as the drive source for the grinder assembly 16, it is possible to employ a pneumatically operated motor or an electric motor in place of the hydraulic motor 15.

Next, will be described an operation of cutting open the tubular liner closing a branch pipe by means of the on-the-sleigh robot 1 of the present invention, with reference to FIGS. 2 through 9.

In FIGS. 2 and 3, the reference numeral 23 designates an underground main pipe, which is already internally lined with a tubular liner 25 by the conventional lining method described earlier. As shown in FIG. 3, a branch pipe 24 branches off the main pipe 23 to extend toward the ground surface. At this moment, however, the liner 25 is sealing the end of the branch pipe 24, and, therefore, it is necessary to cut off that portion of the liner 25 which closes the end of the branch pipe 24 so as to allow the branch pipe 24 to communicate with the main pipe 23. This cutting operation is conducted by means of the on-the-sleigh robot 1 of the present embodiment in the following manner.

As shown in FIG. 2, the on-the-sleigh robot 1 is already brought inside the main pipe 23, and it is being pulled by means of the pull rope 21 in the direction of the arrow (toward the branch pipe 24), while the interior of the main pipe 23, which is lightened by the flash light 7, is monitored by means of the TV camera 8. Incidentally, at this moment, the piston rods 9a are displaced rightward, as seen in FIG. 2, to the maximum degree so that the legs 3, 4, 5 are all tilted quite low and the upper ends of the lengthy legs 5 are brought down sufficiently away from the ceiling of the lined main pipe 23 to allow smooth movement of the on-the-sleigh robot 1 inside the main pipe 23. Also, as shown in FIG. 2, while the on-the-sleigh robot 1 is in transit, the piston rod 12a is kept withdrawn into the first piston cylinder 12, and the piston rod 14a is kept thrusted out from the second piston cylinder 14, so that the grinder assembly 16 is disposed at its lowest possible position.

Now, when the crouching on-the-sleigh robot 1 arrives at a desired position, as shown in FIG. 3, where the grinder assembly comes under that portion of the tubular liner 25 which is closing the branch pipe 24, pulling of the on-the-sleigh robot 1 is ceased.

Next, the hydraulic piston cylinders 9 on either side of the main body 6 are driven to displace their respective piston rods 9a forward (leftward as seen in FIG. 3), whereupon the main body 6 undergoes a parallel motion with the legs 3, 4, 5 oscillating backward. (clockwise as viewed in FIG. 3) about the respective pivotal points d, e, f, until the upper ends of the lengthy legs 5 are pressed against the ceiling of the main pipe 23 lined with the tubular liner 25. With the upper ends of the lengthy legs 5 thus caught by the ceiling of the main pipe 23, the on-the-sleigh robot 1 is immobilized at the desired location as shown in FIG. 3. As described above, the legs 3, 4, 5 are pivoted on the main body 6 at locations alongside the center line of the main body 6, and the distance L1 from the pivotal point c to the upper end of the leg 5 is equal to the distance L2 from the pivotal point c to the lower end (L1=L2), so that the main body 6 as it is raised by the uprising of the legs 3, 4, 5 assumes a position roughly at the same level as the center line of the main pipe 23.

Figure 4:
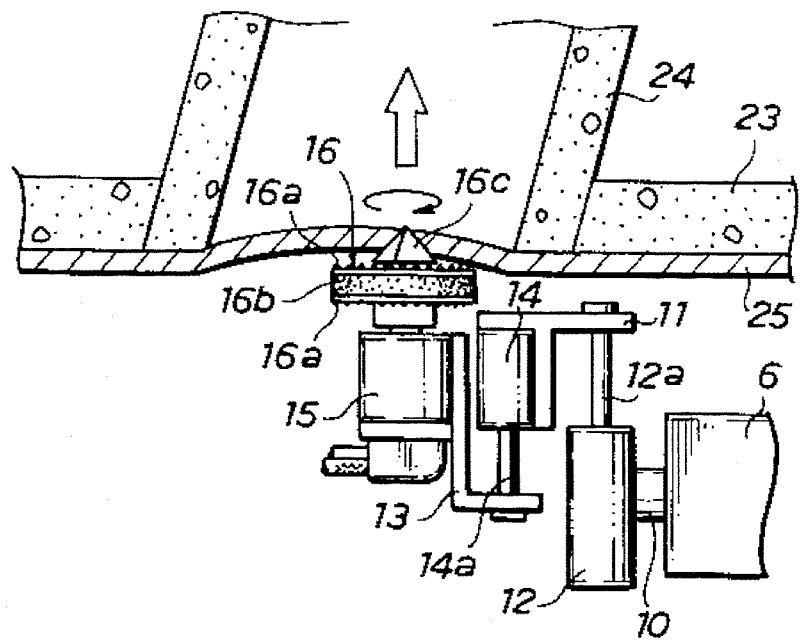
FIG. 4 is a vertical cross section of the main and branch pipes taken along the center line of the main pipe, wherein the liner is being cut by the on-the-sleigh robot of the invention.
Figure 5:
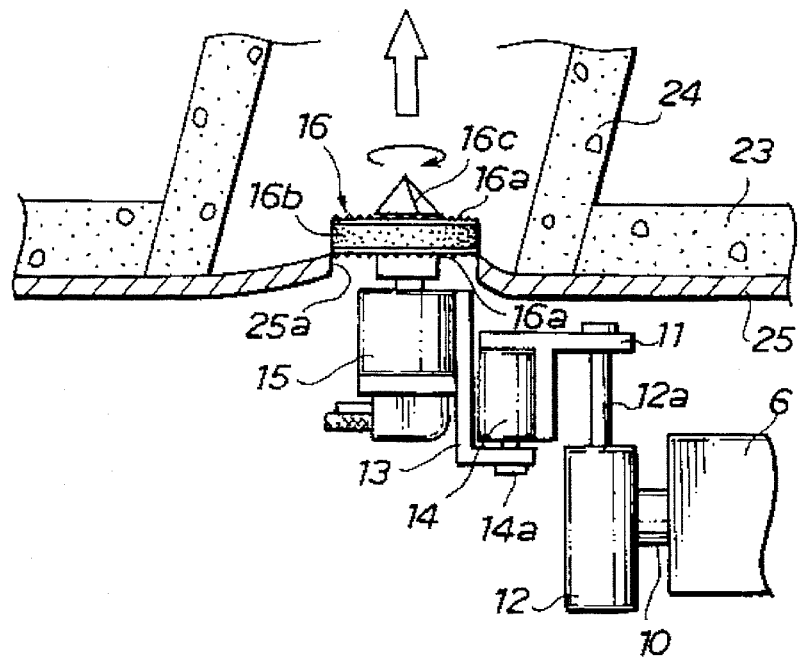
FIG. 5 is a vertical cross section similar to FIG. 4, showing how the liner is cut off.
Figure 6:
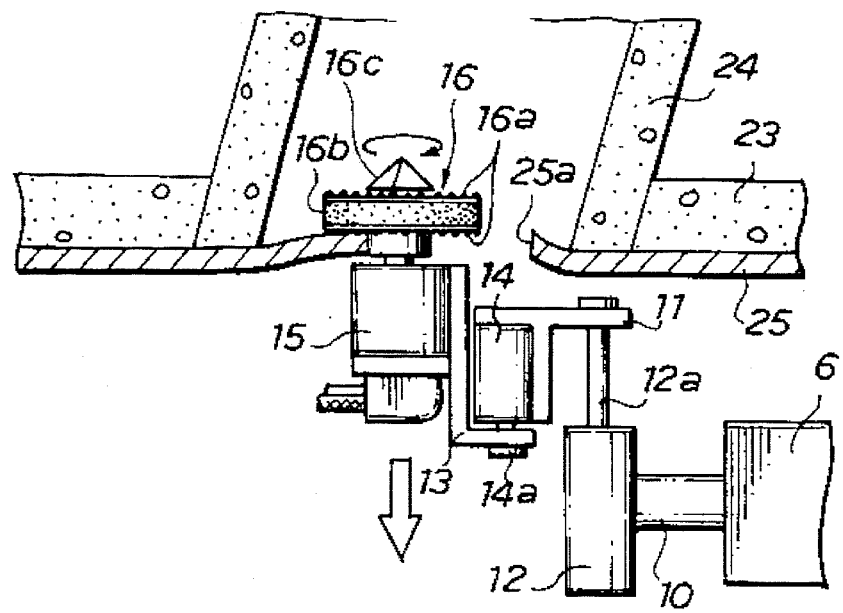
FIG. 6 is a vertical cross section similar as FIG. 4 to show a further step of the cutting operation.

When the on-the-sleigh robot 1 is prepared in the main pipe 23 as described above, the hydraulic motor 15 is driven to turn the grinder assembly 16. Then, the first hydraulic cylinder 12 is driven such that its rod 12a is gradually thrusted upward, as shown in FIG. 4, whereupon the first holder 11, the second piston cylinder 14, the second folder 13, the hydraulic motor 15 together with the grinder assembly 16 are raised in one body, and as the result., the tapered reamer 16c of the spinning grinder assembly 16 bores open a small hole in the tubular liner 25. Eventually, the maximum amount of the rod 12a is thrusted out, and then the rod 12a is locked thus. Next, the second hydraulic cylinder 14 is driven such that the already fully thrusted out piston rod 14a is gradually withdrawn. Thereupon, the second folder 13 and the hydraulic motor 15 supported thereby and the grinder assembly 16 are altogether raised relative to the first holder 11, and as the result, the abrasive top-side face of the upper sanding plate 16a grinds through the thickness of the tubular liner 25, and eventually there is made in the tubular liner 25 a big hole 25a which has a diameter equal to that of the sanding plate 16a, as shown in FIG. 5.

Figure 7:
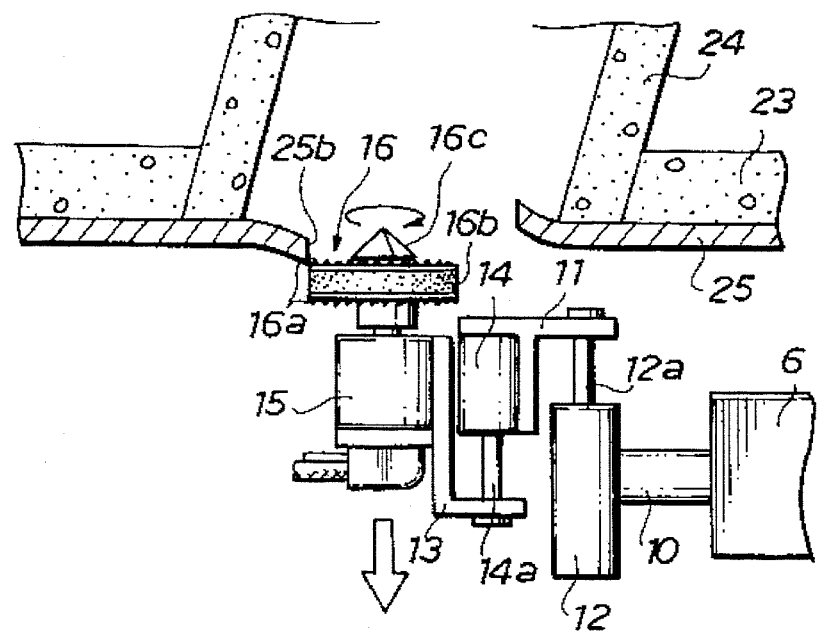
FIG. 7 is a vertical cross section similar as FIG. 4 to show a still further step of the cutting operation.

Next, the slider rod 10 is displaced forward in the main body 6 so that the grinder assembly 16 is shifted forward (leftward as viewed in FIG. 6), and then the second hydraulic cylinder 14 is driven to thrust down its rod 14a, whereupon the abrasive bottom-side face of the lower sanding plate 16a grinds through the thickness of the tubular liner 25, and as the result, there is made a bigger hole 25b in the tubular liner 25, as shown in FIG. 7.

Figure 8:
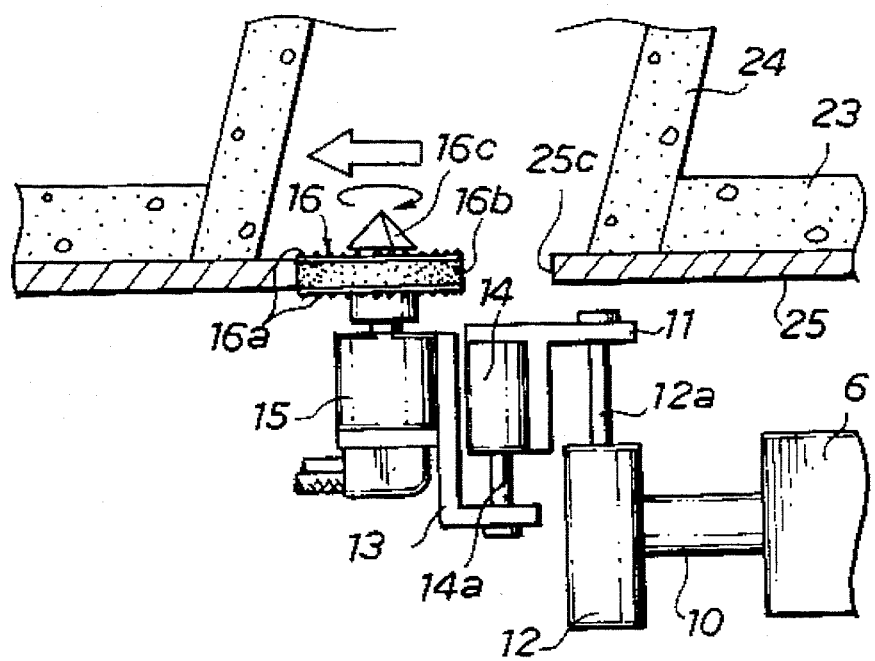
FIG. 8 is a vertical cross section similar as FIG. 4 to show a subsequent step of the cutting operation.
Figure 9:
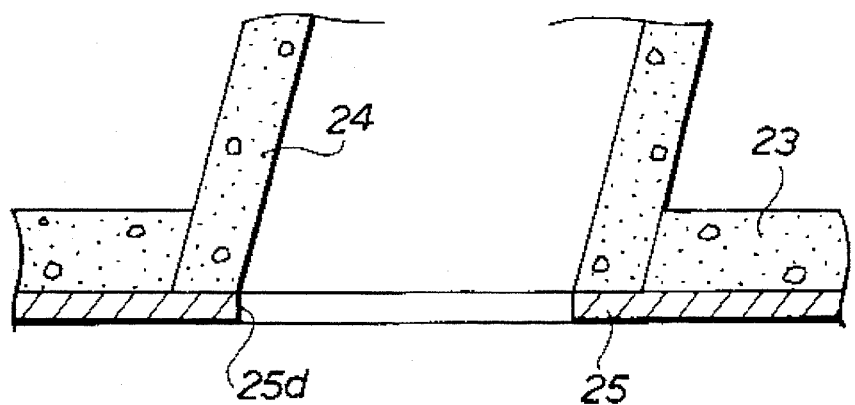
FIG. 9 is a vertical cross section similar as FIG. 4 after the obstacle portion of the liner is cut off completely.
Figure 10:
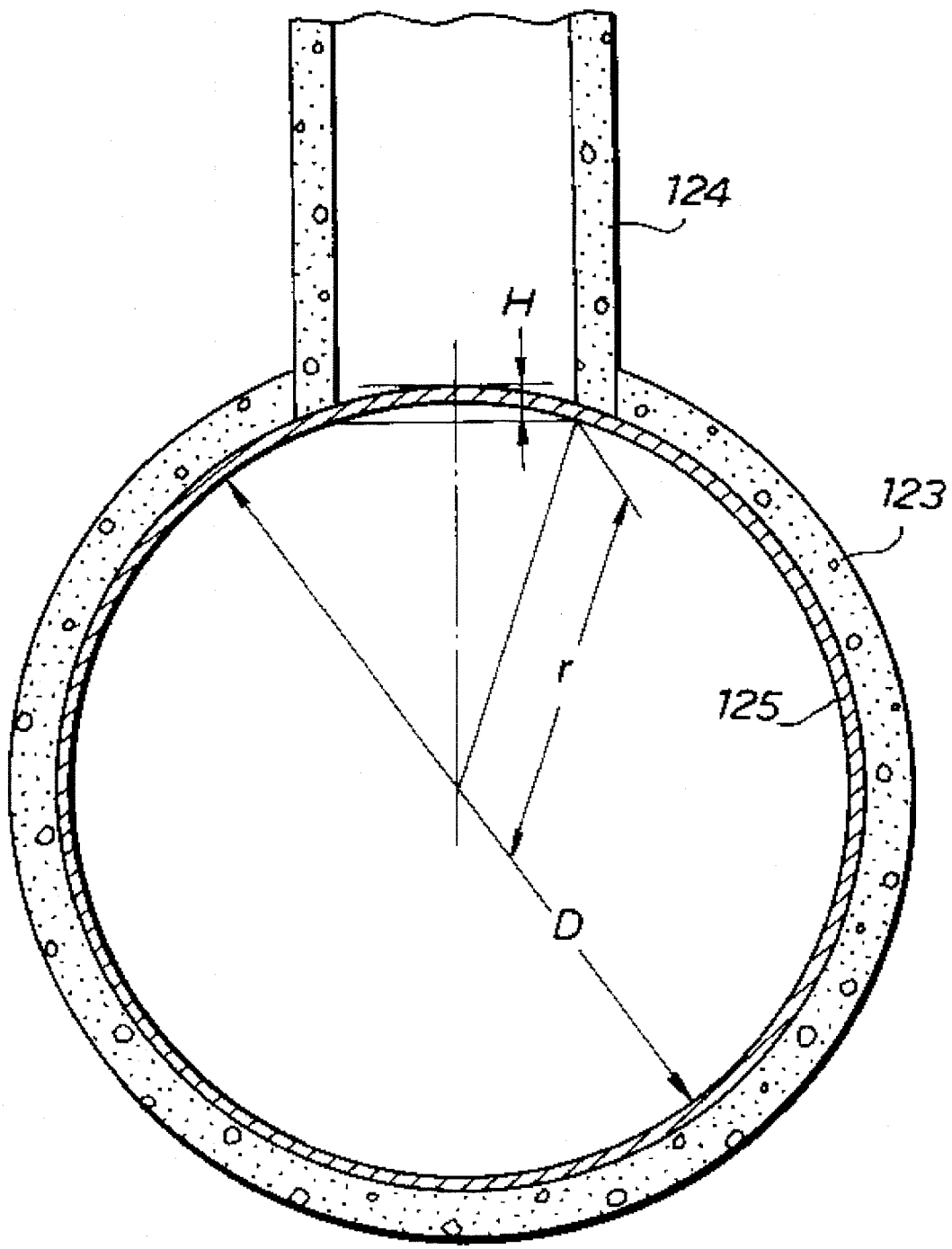
FIG. 10 is a vertical cross section of the main and branch pipes taken on a plane normal to the center line of the main pipe.
Figure 11:
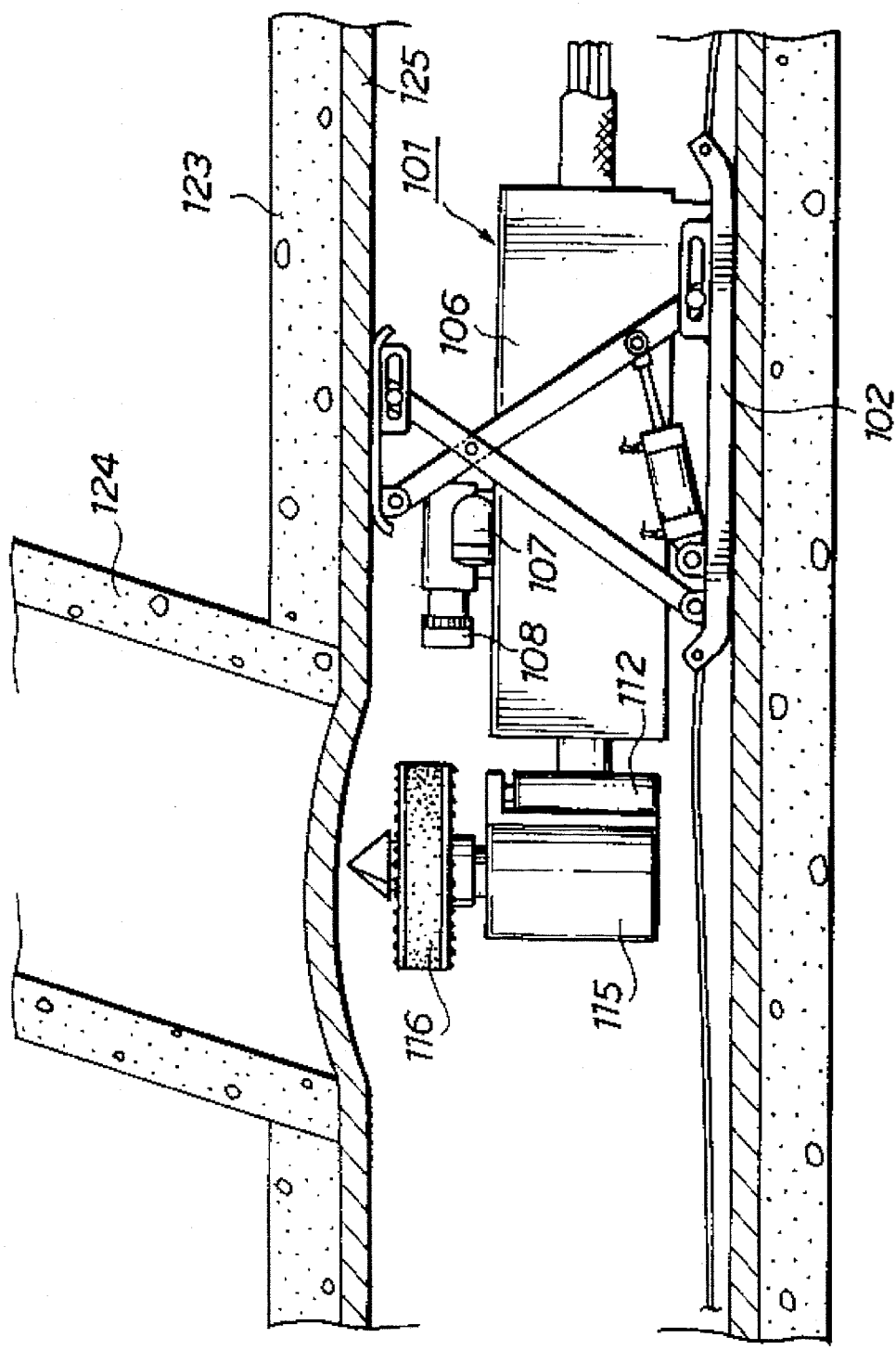
FIG. 11 is a side view of a conventional on-the-sleigh robot operating in a main pipe.

Thus, as this vertical and sideward movement of the grinder assembly 16 is repeated, a desired hole is cut open in the tubular liner 25 by the upper and lower sanding plates 16a alternately, and the remnant burrs are removed as they are ground by the abrasive lateral face of the support disk 16b of the grinder assembly 16, as shown in FIG. 8. More particularly, with reference to FIG. 8, the side face of the support disk 16b of the grinder assembly 16 is pressed against the ground edge of the tubular liner 25 (inner periphery of the hole 25c) and moved laterally (forward, backward, and sideways) until all the burrs of the tubular liner 25 are ground off by the lateral face of the support disk 16b; as the result, a (elliptical) hole 25d is made in the tubular liner 25 which is congruent and coincident with the end hole of the branch pipe 24, as shown in FIG. 9. Thus, the branch pipe 24 communicates with the main pipe 23 via this hole 25d.

Now, as described above, in this embodiment, the amount of possible vertical displacement of the first holder 11 relative to the main body 6 is determined by the stroke of the first piston cylinder 12, and the amount of possible vertical displacement of the second holder 13 relative to the first holder 11 is determined by the stroke of the second piston cylinder 14; therefore, the amount of possible vertical displacement of the grinder assembly 16 supported on the second holder 14 relative to the main body 6 is the sum of the respective strokes of the first piston cylinder 12 and the second piston cylinder 14. Accordingly, the amount of vertical displacement of the grinder assembly 16 of the present embodiment is increased over the prior art by the amount equal to the stroke of the second piston cylinder 14; hence it is now possible to provide the grinder assembly 16 with a sufficient amount of vertical movement, enabling the operator to conduct a more accurate and effective cutting operation.

As is clear from the above description, according to this embodiment, there is proposed an on-the-sleigh robot having a horizontally extending main body, legs shod with the sleigh, and a head portion equipped with a rotary grinder assembly, wherein this head portion includes a hydraulic motor having an upward output shaft to bear the grinder assembly about its end thereof, a plurality of holders, and a plurality of vertically held hydraulic piston cylinders, arranged such that the first piston cylinder connected to the end of a slider rod extending from main body has an upward piston rod, and the first holder supported at the end of the upward piston rod of the first piston cylinder holds the second piston cylinder, and the second holder supported at the end of the downward piston rod of the second piston cylinder holds the motor, so that the operator can vertically displace the grinder assembly by two steps and to a greater height relative to the main body of the on-th-sleigh robot. Thus, the cutting operation will be conducted at a higher efficiency and in a shorter time.

While the invention has been described in its preferred embodiment, it is to be understood that modifications will occur to those skilled in he art without departing from the spirit of the invention.

What is claimed is:

1. A cutter apparatus used to operate in a horizontal pipe, said apparatus having a horizontally extending main body, a stand means to support said main body aloft, and a head bearing a rotary grinder assembly, wherein this head comprises:

(i) a motor having an upward output shaft to turn said grinder assembly locked about the end thereof, (ii) a plurality of holder means, and (iii) a plurality of vertically held piston cylinders in the same amount as said holder means;

which piston cylinders are arranged such that a first cylinder is connected to said main body, a second cylinder is held by a first holder means which is supported by the piston rod of the first cylinder, a third cylinder is held by a second holder means which is supported by the piston rod of the second cylinder, and so on until finally said motor is held by the last one of the holder means which is supported by the piston rod of the last one of the cylinders, wherein the first cylinder has a length which is approximately equal to the total length of the second cylinder and the piston rod of the second cylinder.

2. The cutter apparatus as recited in claim 1, wherein the piston cylinders are arranged such that each one has its piston rod extending in the direction opposite to the direction of the neighboring piston cylinder (s).

3. The cutter apparatus as recited in claim 2, comprising two piston cylinders and two holder means, the first piston cylinder connected to said main body has an upward piston rod, the first holder means supported at the end of said upward piston rod of the first piston cylinder holds the second piston cylinder, and the second holder means supported at the end of the downward piston rod of the second piston cylinder holds the motor.

\* \* \* \* \*